United States Patent [19]

Grzeslo

[11] 3,969,939

[45] July 20, 1976

[54] TEMPERATURE COMPENSATOR FOR GAS FLOW METER

[76] Inventor: Ignacy John Grzeslo, 97 Poynter Drive, Weston, Ontario, Canada, M9R 1L6

[22] Filed: Apr. 28, 1975

[21] Appl. No.: 572,172

[30] Foreign Application Priority Data

Mar. 20, 1975 Canada .............................. 222660

[52] U.S. Cl........................... 73/194 M; 73/231 M; 73/233
[51] Int. Cl.²........................................ G01F 15/04
[58] Field of Search ............ 73/194 M, 230, 231 M, 73/233

[56] References Cited
UNITED STATES PATENTS

| | | | |
|---|---|---|---|
| 1,923,356 | 8/1933 | Diehl | 73/233 |
| 2,093,151 | 9/1937 | MacLean | 73/233 |
| 2,117,341 | 5/1938 | MacLean | 73/233 |
| 3,169,399 | 2/1965 | Allport et al. | 73/233 |
| 3,581,566 | 6/1971 | Randall et al. | 73/233 X |

*Primary Examiner*—Herbert Goldstein
*Assistant Examiner*—John P. Beauchamp
*Attorney, Agent, or Firm*—Robert G. Hirons

[57] ABSTRACT

A temperature compensator for a fluid flow meter, e.g. an industrial gas meter, has a temperature sensing element which contacts the flow of fluid being metered. The temperature sensing element adjusts the position of a cam surface so as to limit the arc of travel of an oscillating cam striker element in accordance with the temperature of the fluid. The cam striker element is driven in both directions by means operatively associated with a driving element driven by the fluid flow. A recorder records the distance travelled by the cam striker element in a given time, so as to provide a reading of temperature compensated fluid flow.

7 Claims, 2 Drawing Figures

TEMPERATURE COMPENSATOR FOR GAS FLOW METER

FIELD OF THE INVENTION

This invention relates to fluid flow measuring devices, and more particularly to a temperature compensating device for use with a fluid flow meter.

In gas flow meters, particularly those for industrial use required to measure large volumes of gas being used for heating purposes, it is necessary to allow for density changes in the gas being metered, caused by temperature fluctuations. As the temperature rises and the volume of gas increases, the heating capacity of a given volume of gas is reduced. Since heating gas is normally sold to the industrial user on the basis of a price per volume at standard temperature, which is equivalent to a price per thermal unit of heating capacity of the gas, suitable allowance for temperature fluctuations in the gas volume measuring device must be made. This is conveniently accomplished by applying automatic temperature compensation means to the meter upon which the consumer records the volume of gas consumed.

BRIEF DESCRIPTION OF THE PRIOR ART

There are a number of criteria which a satisfactory temperature compensating device for a gas flow meter should meet, especially for industrial purposes. Primarily, it should function automatically and accurately over substantial periods of time. It should require little and infrequent maintenance and service. It should also have some means by which its general accuracy can be checked periodically, in simple fashion. Prior art temperature compensators for use with gas flow meters have suffered from various defects which have rendered them unsuitable for accurate operation over extended periods of time. In one form, for example in U.S. Pat. No. 3,581,566, the arc of travel of an indicator means, driven by the gas flow, is measured by a measuring device, and the arc of travel is limited by a stop positioned according to the temperature of the gas flow. Such a device tends to give inaccurate readings after a time, due to accumulations of dust, etc., which hinder the travel of the indicator means, and due to wear of the parts. It is an object of the present invention to provide an improved temperature compensating device for use with a fluid flow meter.

SUMMARY OF THE INVENTION

The temperature compensating device of the present invention is adapted for use with fluid flow meters, and includes means for recording temperature corrected fluid volumes and uncorrected fluid volumes simultaneously, so that checks on its accuracy can be readily performed. The device of the present invention also includes features which improve the accuracy of the performance of the device, and allow its uninterrupted use over long periods of time with only minimal maintenance requirements, as compared with devices previously proposed for this purpose.

Thus according to the present invention there is provided a temperature compensating device for use with a fluid flow meter, said device comprising:

a driving element adapted to be driven by fluid flowing through the meter;

first fluid volume recording means operatively associated with said driving element to record fluid volumes flowing through the meter;

temperature sensing means adapted to contact the fluid flowing through the meter;

a cam surface bearing element connected to said temperature sensing means, the position of said cam surface being determined by the temperature sensed by the temperature sensing means;

an oscillatable cam striker element adapted to oscillate through an arc of travel defined at the first extremity by contact with said cam surface and at the second extremity by preset limiting means;

the cam striker element being driven for oscillation in both directions, into and out of contact with the cam surface, by driven means operatively associated with said driving element;

second fluid volume recording means operatively associated with the cam striker element and responsive to the length of the arc of travel of the cam striker element.

The device of the invention thus has a cam striker element which travels through an arc, the length of this arc of travel being determined by the temperature of the flowing fluid, and the speed of travel of the cam striker element being determined by the volume of gas flowing through the meter in the time period, and is recorded by suitable recording means.

In accordance with the invention, the cam striker element is positively driven in both of its directions of oscillation through its arc of travel. This arrangement provides enhanced accuracy over extended periods of time in service, as compared with the use of non-positive drive means in one or both directions such as spring urgings or gravity feeds, since such means are apt to become inefficient and inaccurate through contamination with dust and the like after extended use.

DESCRIPTION OF THE PREFERRED EMBODIMENTS

In a preferred embodiment of the invention, the cam striker element has a friction surface for contacting the cam surface, and the cam surface is roughened. Suitably the friction surface of the cam striker element is a sleeve of rubber or plastics material such as polyethylene, nylon or the like, and the cam surface is roughened by the provision of serrations thereon. Such arrangements prevent slippage between the cam striker element and the cam surface on contact, so that the arc of travel of the cam striker element is accurately determined by the position of the cam surface.

Preferably also, the driving means for driving the cam striker element for oscillation comprises an eccentric pin driven by the driving element, and a lever connected to said eccentric pin through a pin and slot connection and pivotally connected to the cam striker element to cause oscillation thereof as said eccentric is driven, said pin and slot connection providing lost motion to permit continued drive of said eccentric when oscillation of the cam striker element is limited by contact thereof with the cam surface.

The device of the invention may also advantageously have preset limiting means which defines the second extremity of the arc of travel of the cam striker element, comprising an adjustable stop limiting the lost motion in the pin and slot connection. The adjustable stop may comprise a spring urged set screw protruding to define an effective limit of the slot of said pin and slot connection. Such a set screw is thus adjusted to calibrate the instrument for correct reading at a given temperature.

A specific preferred embodiment of the invention will now be described with reference to the accompanying drawings, in which.

In the drawings, like reference numerals indicate like parts.

Figure 1:
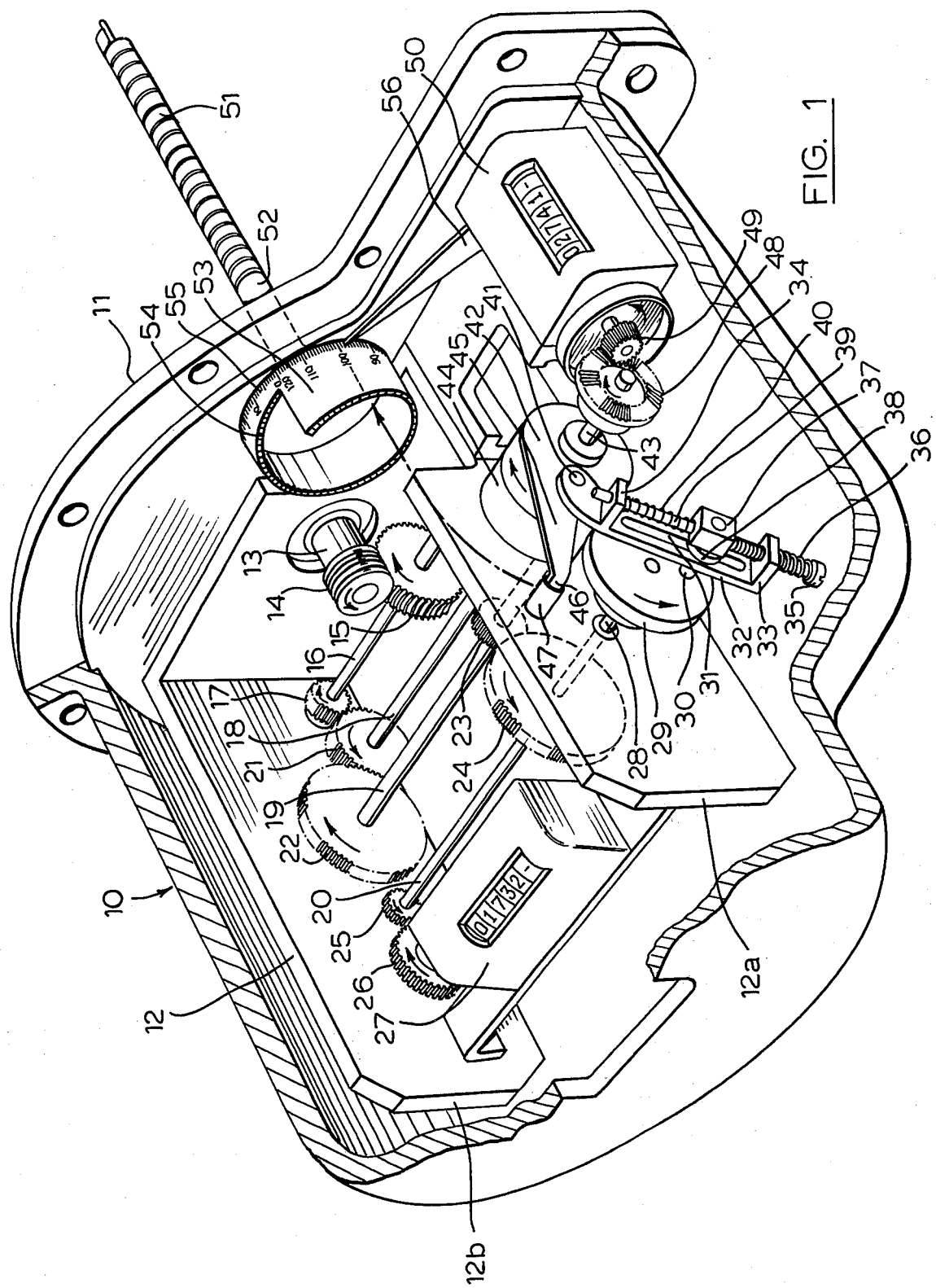
FIG. 1 is a perspective view of a temperature compensation device, with the housing partly cut away for illustrative purposes, and with the operative mechanism in a first position.

With reference to FIG. 1, the temperature compensating device comprises a housing 10 having an end plate 11 adapted to be secured to a duct through which gas being metered is conveyed. The housing has secured thereto a chassis 12 on which the operative parts for the most part are mounted. The chassis 12 has forward and rearward upstanding side members 12a and 12b respectively. Projecting through an aperture in the end plate 11 and chassis 12 is a driving shaft 13 carrying a worm gear 14, the driving shaft being coupled to a positive displacement fluid meter (not shown) so that it is rotated by the impellor of the meter. Worm gear 14 meshes with and drives worm wheel 15 on a shaft 16 which is journalled in the side portions 12a and 12b of the chassis 12, and which carries a further spur gear 17.

The device includes a gear train which is driven by spur gear 17, the gear train consisting of shafts 18, 19, 20 disposed parallel to shaft 16 and journalled in the side portions of 12a and 12b of the chassis 12. Shaft 18 carries a spur gear 21 meshing with and driven by spur gear 17, and also meshing with and driving a spur gear 22 mounted on shaft 19. A further spur gear 23 is mounted on shaft 19, and thus meshes with and drives a spur gear 24 on shaft 20. The shaft 20 also carries another spur gear 25, which meshes with a gear wheel 26 on a rev counter 27. Thus, shafts 18, 19, 20 and rev counter 27 are driven directly from driving shaft 13 and worm gear 14, in response to the volume of gas flowing through the meter, without regard to temperature.

Shaft 20 is journalled in the side members of the chassis 12, and a portion 28 thereof extends through the forward side member 12a of the chassis 12. Shaft portion 28 carries on its end a wheel 29 with an eccentric pin 30. The pin 30 is received in the elongated slot 31 of a slotted lever 32, so that the pin 30 is slidably received within the slot 31. The lever 32 is provided with a pair of apertured projections 33, 34 extending forwardly from the lever 32 at the top and bottom of slot 31. A set screw 35 extends through the aperture in lower projection 33 of lever 32, and is adjustable to extend to a greater or lesser extent through apertured projection 33, the aperture in which is appropriately screw-threaded, the set screw extending generally parallel to slot 31 a spring 36 is located between the head of set screw 35 and the bottom of lower projection 33, to assist in holding the set screw in its pre-determined position.

Pin 30 passes through slot 31 in lever 32 at the end remote from wheel 29 and is pivotally received in a stop member 37. A washer 38 is interposed on pin 30 between lever 32 and stop member 37. Projecting upwardly from stop member 37, parallel to slot 31 in lever 32, is a generally cylindrical pin 39, which extends through the aperture in upper projection 34 of lever 32. Pin 39 carries a compression spring 40 urging against the lower surface of projection 34 and the upper surface of stop member 37.

At its upper end, lever 32 is pivotally connected at 41 to a cam striker element 42. The cam striker element 42 is mounted for rotation on a stub shaft 43 which is journalled at one end in side portion 12a of chassis 12. The cam striker 42 is connected to stub shaft 43 for drive in one direction only by means of a one-way clutch 44 mounted on shaft 43 between chassis side portion 12a and cam striker element 42. The cam striker element 42 has a radial arm 45 provided with a rearwardly projecting finger 46, the finger 46 being covered with a sleeve 47 of plastic.

The other end of stub shaft 43 carries a radial gear wheel 48, which meshes with and drives the gear wheel 49 on the rev counter 50.

A bimetallic coiled temperature strip 51 mounted on a rod 52 is disposed outside the housing 10 of the device, in the path of flow of gas through the meter. Rod 52 extends through the end plate 11 of the housing 10, and carries on its end within the housing 10 a cam surface bearing element in the form of a cam wheel 53 bearing a serrated cam surface 54 projecting axially with respect to the rod 52. The cam wheel 53 is arranged so that serrated cam surface 54 is in the path of travel of finger 46 of cam striker element 42. Cam wheel 53 bears a visual temperature related scale 55. A pointer 56 extends from the rev counter 50 to the vicinity of the scale 55, so that as cam wheel 53 rotates in response to temperature changes sensed by metallic strip 51, pointer 56 indicates the appropriate approximate temperature on scale 55.

In operation, gas flowing through the associated gas meter (not shown) causes rotation of the impellor of the gas meter which drives shaft 13, which acts as a driving element for the temperature compensating device. By means of the associated gear train and shafts 18, 19 and 20, this drive is transmitted to rev counter 27 to measure actual volume of gas flowing through the meter as previously described, without regard to temperature. Rev counter 27 is thus a first fluid volume recording means of the device, and is operatively associated with shaft 13.

Bimetallic strip 51 constitutes a temperature sensing means and contacts gas flowing through the meter and causes rotation of rod 52 and cam wheel 53 in response to the temperature of the flowing gas. The rotational position of cam wheel 53, and hence the precise location of serrated cam surface 54 presented to be struck by finger 46 of cam striker element 42, is thus determined by the temperature of the flowing gas. This limits the arc of oscillation of the cam striker element 42, as described below.

Figure 2:
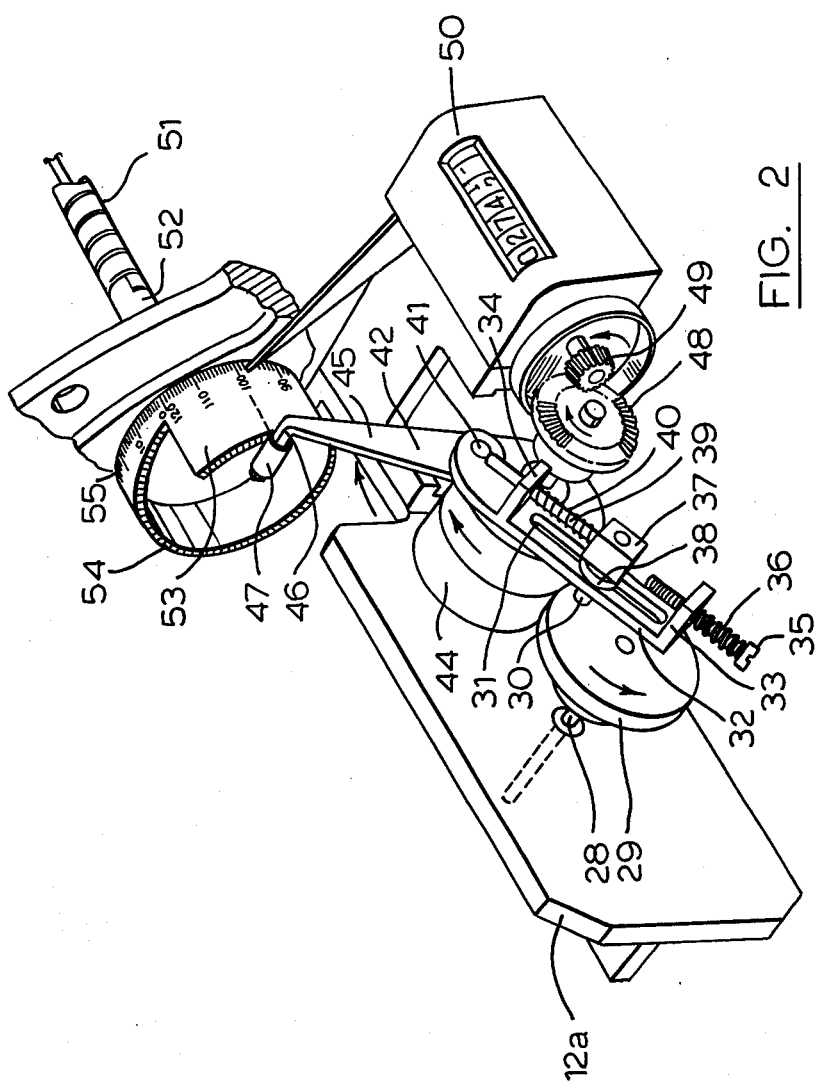
FIG. 2 is a perspective view of a part of the device of FIG. 1, with the operative parts in a second position.

Shaft 20 is driven by the gear train from shaft 13 as previously described, so that wheel 29 rotates counter clockwise. As it rotates, eccentric pin 30 circles around shaft extension 28 and moves up and down slot 31 of lever 32, causing lever 32 to pivot about its pivotal connection 41 to cam striker element 45. As wheel 29 rotates from its position shown in FIG. 1 towards its position shown in FIG. 2, pin 30 moves up slot 31, carrying stop member 37 with it and compressing spring 40 against upper projection 34. This movement and compression causes rotation of cam striker element 42 about stub shaft 43, from its position shown in FIG. 1 to its position shown in FIG. 2, in which friction surface 47 on finger 46 of cam striker element 42 contacts the appropriate location of cam surface 54 as determined by the temperature of the flowing gas. If lever 32 continues to urge cam striker element 42 to the right shown in FIG. 2, after contact with the cam surface 54, due to rotation of wheel 29, the motion is absorbed as lost motion by movement of pin 39 further through the aperture in upper projection 34 of lever 32, against the urging of spring 40, as pin 30 moves further up slot 31.

As pin 30 on wheel 29 rotates further in the counter clockwise direction, pin 30 and associated stop member 37 moves back down slot 31 in lever 32 as a lost motion until stop member 37 comes into contact with the end of set screw 35. When stop member 37 is in contact with set screw 35, further movement down slot 31 is prevented and so additional rotation of wheel 29 causes lever 32 to pull cam striker element 42 away from cam surface 54 back to its position shown in FIG. 1, and then the cycle is repeated, causing oscillation of the cam striker element 42 through an arc. Thus the set screw 35 constitutes stop means limiting the arc of oscillation of cam striker element 42 at one end, the cam surface 54 limiting the arc of oscillation at the other end.

As cam striker 42 oscillates, one way clutch 44 disengages during movement to the right as shown in FIG. 1, but engages during movement to the left so as to rotate shaft 43 and drive counter 50. By this means, counter 50 registers the arc of oscillation of cam striker element 42 in one direction, the length of which arc is determined by the set of screw 35, and the temperature sensed and registered by cam surface 54. Set screw 35 is initially adjusted to calibrate the temperature compensating device. As described, cam striker element 42 is driven in both directions, into and out of contact with the cam surface, by the lever 32 driven from wheel 29 and shaft extension 28.

I claim the following to be my invention:

1. A temperature compensating device for use with a fluid flow meter, said device comprising:
   a driving element adapted to be driven by fluid flowing through the meter;
   first fluid volume recording means drivingly connected with said driving element to record fluid volumes flowing through the meter;
   temperature sensing means adapted to contact the fluid flowing through the meter;
   a cam surface bearing element connected to said temperature sensing means, the position of said cam surface being determined by the temperature sensed by the temperature sensing means;
   an oscillatable cam striker element adapted to oscillate through an arc of travel defined at the first extremity by contact with said cam surface and at the second extremity by pre-set limiting means;
   driven means which drives the cam striker element for oscillation in both directions, into and out of contact with the cam surface, the driven means comprising an eccentric driven by the driving element, and a lever connected to the eccentric by a pin and slot connection and pivotally connected with the cam striker element to cause oscillation thereof as said eccentric is driven, said pin and slot connection providing lost motion to permit continued drive of said eccentric when oscillation of the cam striker element is limited by contact thereof with the cam surface;
   second fluid volume recording means drivingly connected with the cam striker element and responsive to the length of the arc of travel of the cam striker element.

2. The device of claim 1 wherein the cam striker element has a friction surface for contacting the cam surface.

3. The device of claim 2 wherein the cam surface is roughened.

4. The device of claim 1 wherein the pre-set limiting means which defines the second extremity of the arc of travel of the cam striker element comprises an adjustable stop limiting the lost motion in the pin and slot connection.

5. The device of claim 4 wherein the adjustable stop comprises a spring locked set screw protruding to define an effective limit of the slot of said pin and slot connection.

6. The device of claim 1 wherein the cam striker element communicates with a counter through the intermediary of a one way clutch, arranged to record the arc of travel of the cam striker element in response to the travel of the cam striker element in one direction.

7. The device of claim 6 wherein the temperature sensing means comprises a coiled bimetallic strip and the cam surface bearing element is a disc which rotates in response to temperature induced rotations of the bimetallic strip, the cam surface thereof being presented in an axial direction with respect to the axis of the coiled bimetallic strip.

* * * * *